United States Patent
Nakajima

(10) Patent No.: US 8,649,449 B2
(45) Date of Patent: Feb. 11, 2014

(54) SENDING APPARATUS, RECEPTION APPARATUS, WIRELESS APPARATUS AND TRANSMISSION MODE CONTROL METHOD FOR SENDING APPARATUS

(75) Inventor: Yasuhisa Nakajima, Kanagawa (JP)

(73) Assignee: Sony Corporation (JP)

( * ) Notice: Subject to any disclaimer, the term of this patent is extended or adjusted under 35 U.S.C. 154(b) by 261 days.

(21) Appl. No.: 12/998,297

(22) PCT Filed: Aug. 9, 2010

(86) PCT No.: PCT/JP2010/063510
§ 371 (c)(1),
(2), (4) Date: Jun. 23, 2011

(87) PCT Pub. No.: WO2011/021527
PCT Pub. Date: Feb. 24, 2011

(65) Prior Publication Data
US 2011/0243193 A1 Oct. 6, 2011

(30) Foreign Application Priority Data
Aug. 18, 2009 (JP) ................................ P2009-189560

(51) Int. Cl.
*H04L 27/28* (2006.01)
*H04B 7/02* (2006.01)

(52) U.S. Cl.
USPC .......................................... 375/260; 375/267

(58) Field of Classification Search
USPC ........................................ 375/222, 260, 267
See application file for complete search history.

(56) References Cited

U.S. PATENT DOCUMENTS

| | | | |
|---|---|---|---|
| 6,788,653 B1 | 9/2004 | Sakamoto et al. | |
| 7,580,449 B2 | 8/2009 | Kubota et al. | |
| 7,773,687 B2 | 8/2010 | Yoshida | |
| 2004/0215769 A1 | 10/2004 | Yoshida et al. | |
| 2007/0002742 A1* | 1/2007 | Krishnaswamy et al. | 370/235 |
| 2009/0196232 A1* | 8/2009 | Maltsev et al. | 370/328 |
| 2010/0255801 A1* | 10/2010 | Gunasekara et al. | 455/188.2 |
| 2012/0076238 A1* | 3/2012 | Catreux et al. | 375/299 |
| 2012/0275497 A1* | 11/2012 | Li et al. | 375/219 |

FOREIGN PATENT DOCUMENTS

| | | |
|---|---|---|
| JP | 8228173 | 9/1996 |
| JP | 2000-215598 A | 8/2000 |
| JP | 2003-224620 A | 8/2003 |
| JP | 2004-153616 A | 5/2004 |

(Continued)

OTHER PUBLICATIONS

Office Action from Japanese Application No. 2009-189560, dated Aug. 20, 2013.

*Primary Examiner* — Don N Vo
(74) *Attorney, Agent, or Firm* — Lerner, David, Littenberg, Krumholz & Mentlik, LLP

(57) ABSTRACT

A sending apparatus is configured to be able to support a plurality of transmission modes that use different occupied frequency bands in a channel. When user setting information indicates that electrical power consumption is reduced, a coordinator decides upon a transmission mode on a narrowly occupied frequency band side so long as a condition that a transmission rate necessary for transmission of digital information is satisfied. To make it possible to use a channel adjacent to a certain channel in sending of digital information from another sending apparatus, the coordinator changes a transmission mode whose occupied frequency band is wide to a transmission mode whose occupied frequency band is narrow for the transmission using the certain channel so long as a condition that the transmission rate necessary for the transmission of the digital information is satisfied.

9 Claims, 13 Drawing Sheets

(56) References Cited

FOREIGN PATENT DOCUMENTS

| JP | 2004-328319 A | 11/2004 |
| JP | 2005-204218 A | 7/2005 |
| JP | 2006197117 A | 7/2006 |
| JP | 2006253862 A | 9/2006 |
| JP | 2006-295463 A | 10/2006 |
| JP | 2006325120 A | 11/2006 |
| JP | 2008-236664 A | 10/2008 |
| JP | 2009049893 A | 3/2009 |
| JP | 2009094717 A | 4/2009 |
| WO | WO-2005-076512 A1 | 8/2005 |

\* cited by examiner

FIG. 3

|  | MODULATION | INNER FEC | OFDM CARRIER # | PHY RATE | BW |
|---|---|---|---|---|---|
| MODE 2 | 16QAM | 2/3 | 512 | 3.81 Gbps | 1.76 GHz |
| MODE 5 | 16QAM | 2/3 | 256 | 1.90 Gbps | 0.88 GHz |
| MODE 1 | QPSK | 2/3 | 512 | 1.90 Gbps | 1.76 GHz |
| MODE 4 | QPSK | 2/3 | 256 | 0.95 Gbps | 0.88 GHz |
| MODE 0 | QPSK | 1/3 | 512 | 0.95 Gbps | 1.76 GHz |
| MODE 3 | QPSK | 1/3 | 256 | 0.48 Gbps | 0.88 GHz |

| | MODULATION | TX ANT # | RX ANT # | PHY RATE | BW |
|---|---|---|---|---|---|
| MODE 2 | 16QAM | 1 | 1 | 3.81 Gbps | 1.76 GHz |
| MODE 5 | 16QAM | 3/4 | 1/2 | 1.90 Gbps | 0.88 GHz |
| MODE 1 | QPSK | 1 | 1 | 1.90 Gbps | 1.76 GHz |
| MODE 4 | QPSK | 1/4 | 1/20 | 0.95 Gbps | 0.88 GHz |
| MODE 0 | QPSK | 1 | 1 | 0.95 Gbps | 1.76 GHz |
| MODE 3 | QPSK | 1/8 | 1/40 | 0.48 Gbps | 0.88 GHz |

| NUMBER OF PIXELS | FRAME RATE | NUMBER OF BITS | TRANSMISSION RATE | TRANSMISSION MODE |
|---|---|---|---|---|
| 640 X 480 | 60p | 24 | 0.442 Gbps | MODE 3 |
| 1280 X 720 | 59.97/60p | 24 | 1.327 Gbps | MODE 5 |
| | | 30 | 1.659 Gbps | MODE 5 |
| 1920 X 1080 | 23.97/24p | 24 | 1.194 Gbps | MODE 5 |
| | 59.97/60i | 24 | 1.493 Gbps | MODE 5 |
| | | 30 | 1.555 Gbps | MODE 5 |
| | 59.97/60p | 24 | 2.986 Gbps | MODE 2 |

FIG. 9

| SETTING | |
|---|---|
| IMAGE QUALITY SETTING | |
| SOUND QUALITY SETTING | |
| SCREEN MODE | |
| ANTENNA SETTING | |
| BROADCAST SETTING | |
| DISPLAY SETTING | |
| ENERGY-SAVING SETTING | ELECTRICAL POWER CONSUMPTION |
| EXTERNAL INPUT/OUTPUT | STANDARD |
| COMMUNICATION SETTING | REDUCED |

FIG. 15

(PRIOR ART)

|  | MODULATION | INNER FEC | OFDM CARRIER # | PHY RATE | BW |
|---|---|---|---|---|---|
| MODE 2 | 16QAM | 2/3 | 512 | 3.81 Gbps | 1.76 GHz |
| MODE 1 | QPSK | 2/3 | 512 | 1.90 Gbps | 1.76 GHz |
| MODE 0 | QPSK | 1/3 | 512 | 0.95 Gbps | 1.76 GHz |

SENDING APPARATUS, RECEPTION APPARATUS, WIRELESS APPARATUS AND TRANSMISSION MODE CONTROL METHOD FOR SENDING APPARATUS

CROSS-REFERENCES TO RELATED APPLICATIONS

The present application is a national phase entry under 35 U.S.C. §371 of International Application No. PCT/JP2010/063510 filed Aug. 9, 2010, published on Feb. 24, 2011 as WO 2011/021527 A1, which claims priority from Japanese Patent Application No. JP 2009-189560 filed in the Japanese Patent Office on Aug. 18, 2009.

TECHNICAL FIELD

The present invention relates to a sending apparatus, a reception apparatus, a wireless apparatus, and a transmission mode control method for a sending apparatus, and more particularly to a sending apparatus that wirelessly sends digital information such as an AV (Audio Visual) signal in a wireless network and the like.

In a wireless transmission system that wirelessly sends digital information such as an AV signal, the transmission rate and the number of channels of a transmission path thereof have upper limits. Therefore, digital information for which the transmission rate may be too high or the number of channels may be too high cannot be transmitted.

Currently, in a wireless transmission system, a change of a transmission rate is realized by changing a modulation method. With this method, however, even when a transmission rate is changed, the same frequency band in a channel that is being used is occupied. Therefore, the number of channels that perform other transmissions remains insufficient. In addition, since the occupied frequency band does not change, necessary electrical power consumption does not change significantly and a large amount of electrical power is consumed even at a low transmission rate.

FIG. 14 illustrates, for example, a channel plan allocated to a 60 GHz millimeter wave. To the 60 GHz millimeter wave, 9 GHz, which is from 57 GHz to 66 GHz, is allocated as a band. In this 9 GHz, four channels are arranged at intervals of 2.08 GHz. When wireless transmission using the entire band of one channel is performed, an adjacent channel is affected by side lobes of a channel mask and its transmission path quality deteriorates. Therefore, it is common to use the next most adjacent channel usually.

In FIG. 14, if a channel 1 (CH#1) is used, a channel 3 (CH#3) or a channel 4 (CH#4) is to be used. Therefore, in the band around 60 GHz, a maximum of two channels can be used simultaneously, and if the band is used for the purpose of baseband transmission of an AV signal, a maximum of only two AV signal transmissions are possible in the same area.

In addition, depending on the format of an AV signal to be transmitted, the entire band of a channel may not be necessary. However, as illustrated in FIG. 15, the occupied bandwidth cannot be changed in existing transmission modes. For example, in mode 0, the digital modulation method is QPSK (Quadrature Phase ShiftKeying) and the transmission rate is 0.95 Gbps. In addition, in mode 1, the digital modulation method is QPSK and the transmission rate is 1.90 Gbps. Furthermore, in mode 2, the digital modulation method is 16QAM (16 Quadrature Amplitude Modulation) and the transmission rate is 3.81 Gbps. However, the bandwidth (BW) in each mode is the same, which is 1.76 GHz.

For example, in PTL 1, there is proposed a digital signal transmission method with which a transmission rate at which reception can be performed by a reception apparatus (recording apparatus) can be made to be a standard transmission rate, a rate higher than the standard transmission rate, or a rate lower than the standard transmission rate. In addition, for example, in PTL 2, it is proposed that even when the communication statuses of a plurality of physical layers each change from time to time and accordingly the communication quality that can be offered by each physical layer changes from time to time, each application layer makes it possible to transmit using an optimal physical layer in the current communication status. In addition, for example, in PTL 3, there is proposed a transmission apparatus that, when a DU ratio (Desired to Undesired signal ratio) on a reception side is judged to be low, narrows a sending band and performs sending of digital information.

CITATION LIST

Patent Literature

PTL 1: Japanese Unexamined Patent Application Publication No. 2000-215598
PTL 2: Japanese Unexamined Patent Application Publication No. 2004-328319
PTL 3: Japanese Unexamined Patent Application Publication No. 2008-236664

SUMMARY OF INVENTION

Technical Problem

An object of the present invention is to enable reduction of electrical power consumption and efficient use of channels.

Solution to Problem

A concept of the present invention lies in a sending apparatus including:
a digital information sending unit that wirelessly sends digital information to a reception apparatus using a certain channel,
wherein the digital information sending unit is configured to be able to support a plurality of transmission modes that use different occupied frequency bands in the channel, and
wherein the digital information sending unit uses a transmission mode indicated by transmission mode determination information from the reception apparatus or from another wireless apparatus from among the plurality of transmission modes.

In addition, a concept of the present invention lies in a reception apparatus including:
a digital information reception unit that wirelessly receives digital information from a sending apparatus using a certain channel,
wherein the sending apparatus is configured to be able to support a plurality of transmission modes that use different occupied frequency bands in the channel,
the reception apparatus further including:
a transmission rate information reception unit that wirelessly receives information regarding a transmission rate necessary for transmission of the digital information from the sending apparatus;
a transmission mode determination unit that determines a transmission mode at least on the basis of the transmission rate information received by the transmission rate information reception unit; and a transmission mode information sending unit that wirelessly sends information regarding the transmission mode determined by the transmission mode determination unit to the sending apparatus.

Furthermore, a concept of the present invention lies in a wireless apparatus that manages a band in a wireless network including a sending apparatus and a reception apparatus, wherein the sending apparatus wirelessly sends digital information to the reception apparatus using a certain channel and is configured to be able to support a plurality of transmission modes that use different occupied frequency bands in the channel, the wireless apparatus including:

a transmission mode determination unit that determines, when there is a band allocation request from a certain sending apparatus, a transmission mode that satisfies a request transmission rate from among the plurality of transmission modes at least on the basis of information regarding the request transmission rate included in the band allocation request and user setting information relating to electrical power consumption; and a transmission mode information sending unit that wirelessly sends information regarding the transmission mode determined by the transmission mode determination unit to the certain sending unit.

In the present invention, digital information such as an AV signal is wirelessly sent from a sending apparatus to a reception apparatus using a certain channel. In this case, the digital information is sent by a digital information sending unit of the sending apparatus and received by a digital information reception unit of the reception apparatus. For example, an OFDM (orthogonal frequency division multiplex) method or a DS-SS (direct sequence-spread spectrum) method is adopted in the digital information sending unit of the sending apparatus and the digital information reception unit of the reception apparatus. Here, the digital information sending unit of the sending apparatus is configured to be able to support a plurality of transmission modes that use different occupied frequency bands in a channel.

In the digital information sending unit of the sending apparatus, a transmission mode indicated by transmission mode determination information from the reception apparatus or another wireless apparatus from among the plurality of transmission modes. For example, information regarding transmission modes that can be supported by the digital information sending unit of the sending apparatus is wirelessly sent from the transmission mode information sending unit of the sending apparatus to the reception apparatus or the other wireless apparatus. In addition, for example, information regarding a transmission rate necessary for transmission of digital information is wirelessly sent from the transmission rate information sending unit of the sending apparatus to the reception apparatus or the other wireless apparatus. The reception apparatus or the other wireless apparatus then determines a transmission mode at least on the basis of the transmission rate information.

Thus, by configuring the digital information sending unit of the sending apparatus to be able to support the plurality of transmission modes that use different occupied frequency bands in a channel and by using the transmission mode indicated by the transmission mode determination information from the reception apparatus or the other wireless apparatus, reduction of electrical power consumption and efficient use of channels are possible.

For example, in the reception apparatus of the other wireless apparatus, the transmission mode is determined on the basis of the transmission rate information as well as user setting information relating to electrical power consumption. In this case, when the use setting information indicates that electrical power consumption is reduced, a transmission mode on a narrowly occupied frequency band side is decided upon so long as a condition that the transmission rate necessary for the transmission of the digital information is satisfied. With the occupied frequency band being narrowed like this, in the case of the OFDM method, for example, the number of antennas needed can be decreased and electrical power consumption can be reduced.

For example, the plurality of transmission modes that can be supported by the digital information sending unit of the sending apparatus are configured to be a certain number of first transmission modes that use the entire band of the channel as an occupied frequency band and a certain number of second transmission modes that use half a band of the channel as an occupied frequency band. In this case, when the user setting information relating to electrical power consumption indicates standard, the transmission mode determination unit determines a transmission mode from among the certain number of first transmission modes. In contrast, when the user setting information relating to electrical power consumption indicates reduced, the transmission mode determination unit determines the transmission mode from among the certain number of second transmission modes.

For example, in the reception apparatus or the other wireless apparatus during transmission, a change of the transmission mode is decided on the basis of the transmission rate information as well as transmission path quality relating to the digital information. The transmission path quality is judged on the basis of, for example, a PER (Packet Error Rate) of the digital information or an RSSI (Received Signal-Strength Indicator) received by the reception apparatus. If the transmission path quality deteriorates and becomes lower than a certain threshold value, for example, a transmission mode using a narrowly occupied frequency band is changed to a transmission mode using a widely occupied frequency band. Thus, by determining (changing) the transmission mode on the basis of the transmission path quality relating to the digital information, the transmission path quality relating to the digital information can be kept high.

For example, in the transmission mode determination unit of a wireless terminal, when a certain sending apparatus is sending digital information using a certain channel, a change of a transmission mode used by this certain sending apparatus is decided on the basis of a band allocation request from another sending apparatus. Information regarding a transmission mode that has been subjected to the change decision is then sent to the certain sending apparatus from a transmission mode information sending unit of the wireless terminal.

In this case, a transmission mode using a widely occupied frequency band is changed to a transmission mode using a narrowly occupied frequency band so long as a condition that a transmission rate necessary for the transmission of the digital information is satisfied, so that it is possible to use a channel adjacent to the certain channel for sending digital information from another sending apparatus. In doing so, it is possible to perform sending of digital information from a certain sending apparatus and sending of digital information from another sending apparatus in parallel, which enables efficient use of channels.

Advantageous Effects of Invention

According to the present invention, a digital information sending unit of a sending apparatus is configured to be able to support a plurality of transmission modes that use different occupied frequency bands in a channel, and a transmission mode indicated by transmission mode determination information from a reception apparatus or another wireless apparatus is used. This enables reduction of electrical power consumption and efficient use of channels.

BRIEF DESCRIPTION OF DRAWINGS

FIG. 3 is a diagram illustrating a list of transmission modes that can be supported by the transmission units of the sending apparatus and the reception apparatus.

FIG. 9 is a diagram illustrating an example of a user setting screen for user setting relating to electrical power consumption.

FIG. 15 is a diagram illustrating a list of transmission modes.

DESCRIPTION OF EMBODIMENTS

Figure 1:
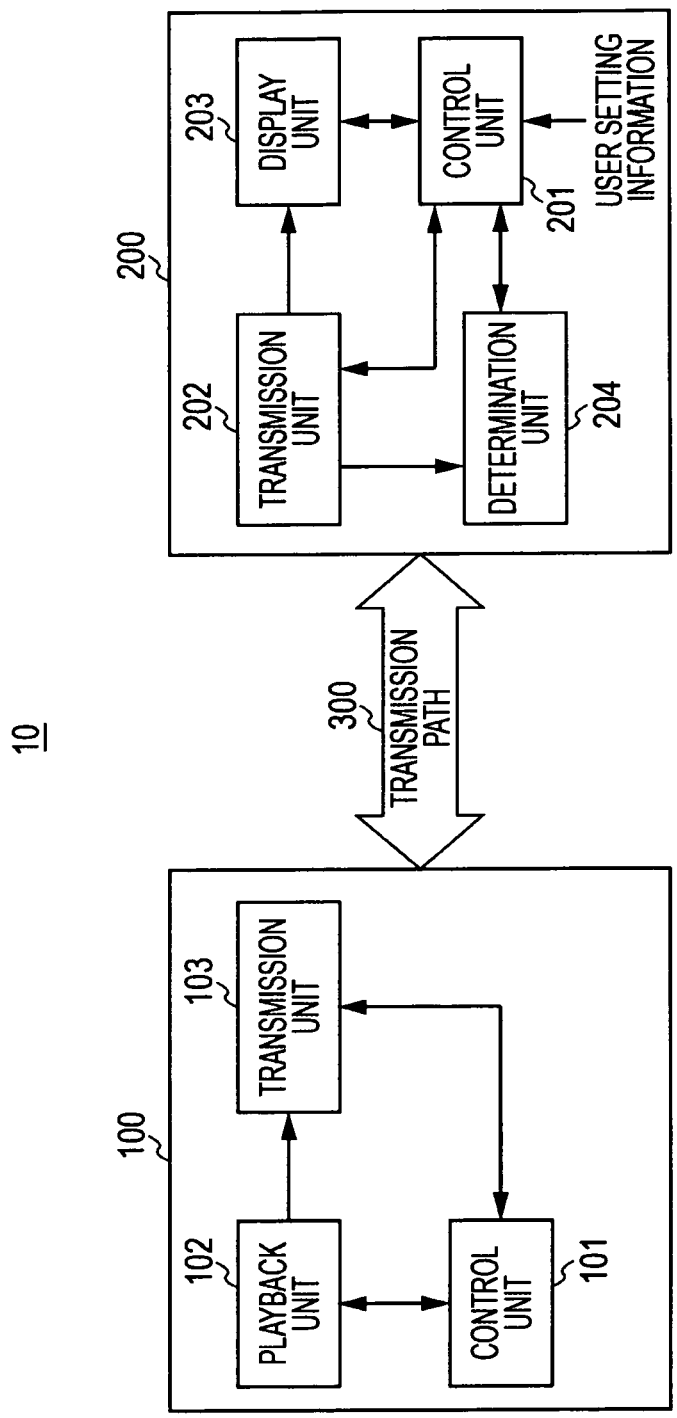
FIG. 1 is a block diagram illustrating a configuration example of a wireless transmission system as an embodiment of the present invention.

Modes for implementing the invention (hereinafter referred to as "embodiments") will be described hereinafter. It is to be noted that the embodiments will be described in the following order:
1. Embodiment
2. Modification 1. Embodiment Configuration of Wireless Transmission System FIG. 1 illustrates a configuration example of a wireless transmission system 10 as an embodiment. The wireless transmission system 10 has a configuration in which a sending apparatus 100 and a reception apparatus 200 are connected by a wireless transmission path 300.

The sending apparatus 100 has a control unit 101, a playback unit 102, and a transmission unit 103. The playback unit 102 plays back AV signals to be sent (image data and audio data) from a recording medium such as an optical disk, an HDD, or a semiconductor memory. The transmission unit 103 is a transmission unit for sending millimeter waves of 60 GHz and adopts a known OFDM method. In addition, a DS-SS method is also adopted when 2.4 GHz or 5 GHz is used.

Figure 2:
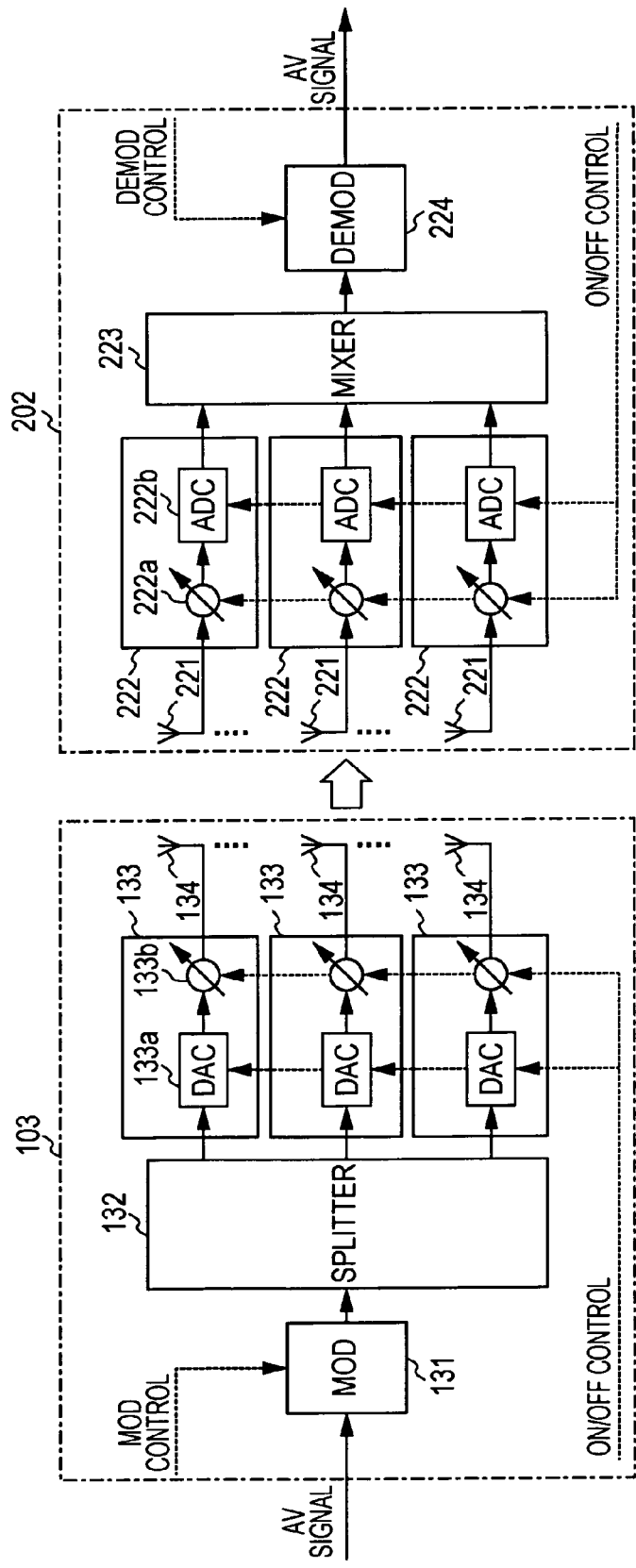
FIG. 2 is a block diagram illustrating a configuration example of transmission units of a sending apparatus and a reception apparatus forming the wireless transmission system.

As illustrated in FIG. 2, the transmission unit 103 has a modulation circuit 131, a splitter circuit 132, a plurality of antenna circuits 133, and a plurality of antennas 134. The transmission unit 103 passes AV signals played back by the playback unit 102 through the modulation circuit 131 that performs baseband modulation, and supplies the AV signals to the plurality of antenna circuits 133 from the splitter circuit 132. It is to be noted that the antenna circuits 133 include D/A converters 133a, power amplifiers 133b, and the like.

Turning back to FIG. 1, the control unit 101 controls the operation of each component of the sending apparatus 100. That is, the control unit 101, the control unit 101 performs processing such as control of AV signal generation performed by the playback unit 102, selection of a modulation method to be used by the modulation circuit 131, control of the antenna circuits 133, calculation of a necessary transmission rate, and sending to the reception apparatus 200.

The reception apparatus 200 has a control unit 201, a transmission unit 202, a display unit 203, and a judgment unit 204. The transmission unit 202 is a transmission unit for receiving millimeter waves of 60 GHz transmitted from the sending apparatus 100 and adopts the OFDM method in accordance with the transmission unit 103 of the sending apparatus 100 described above. As illustrated in FIG. 2, the transmission unit 202 has a plurality of antennas 221, a plurality of antenna circuits 222, a mixer circuit 223, and a demodulation circuit 224. The transmission unit 202 receives millimeter waves of 60 GHz transmitted from the sending apparatus 100 through the plurality of antennas 221, mixes the millimeter waves that have passed through the plurality of antenna circuits 222 with the mixer circuit 223, and performs demodulation at the demodulation circuit 224 to obtain a baseband AV signal.

Turning back to FIG. 1, the display unit 203 displays an image according to image data forming the AV signal obtained by the transmission unit 202. It is to be noted that an audio output system according to audio data forming the AV signal obtained at the transmission unit 202 is omitted. The judgment unit 204 detects the transmission quality of a transmission channel (transmission path quality) and supplies the information to the control unit 201. The judgment unit 204 judges the transmission path quality on the basis of, for example, for example, the PER (Packet Error Rate) of received digital information or an RSSI (Received Signal-Strength Indicator).

The control unit 201 controls operation of each component of the reception apparatus 200. That is, The control unit 201 performs processing such as control of the antenna circuits 222, selection of a demodulation method to be used by the demodulation circuit 224, and control of display performed by the display unit 203. In addition, the control unit 201 performs processing such as control for selecting a transmission mode on the basis of the transmission path quality information detected by the judgment unit 204 and user setting information relating to electrical power consumption, band management (coordination) in a wireless network, and sending of transmission quality information to a sending apparatus.

[Transmission Modes that can be Supported]

FIG. 3 illustrates a list of transmission modes that can be supported by the transmission units 103 and 202. The transmission units 103 and 202 are configured to be able to support mode 0 to mode 2, as well as mode 3 to mode 5. Mode 3 to mode 5 are methods in which a digital modulation method (16QAM/QPSK) defined in mode 0 to mode 2) is not modified whereas the number of subcarriers used in the OFDM is halved, and a necessary frequency band thereof is half that of the original transmission mode. In the case of the DS-SS method, the frequency band can also be half that of the original transmission mode by reducing the data length of a pseudo random noise pattern to half.

In mode 0, the digital modulation method is QPSK and the transmission rate is 0.95 Gbps. In mode 1, the digital modulation method is QPSK and the transmission rate is 1.90 Gbps. In mode 2, the digital modulation method is 16QAM and the transmission rate is 3.81 Gbps. The bandwidth (BW) in mode 0 to mode 2 is 1.76 GHz.

In mode 3, the digital modulation method is QPSK and the transmission rate is 0.48 Gbps. In mode 4, the digital modulation method is QPSK and the transmission rate is 0.95 Gbps. In mode 5, the digital modulation method is 16QAM and the transmission rate is 1.90 Gbps. The bandwidth (BW) in mode 3 to 5 is 0.88 GHz.

Figure 4:
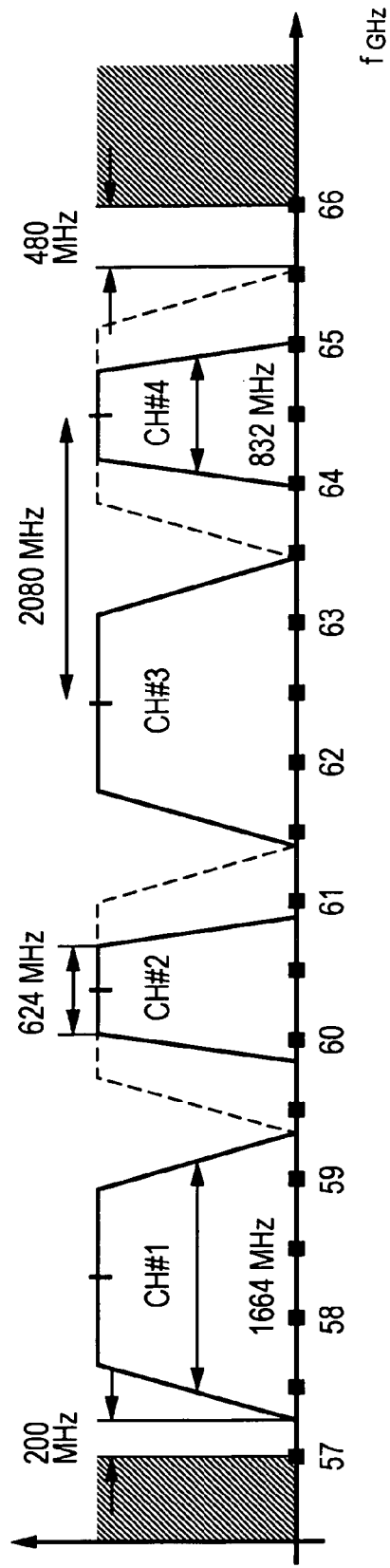
FIG. 4 is a diagram illustrating a channel plan for a 60 GHz millimeter wave and that simultaneous transmission of AV signals of four channels at maximum in a band of 9 GHz around 60 GHz is possible by alternately arranging two transmission modes.

Mode 1 and mode 5 can realize the same transmission rate (1.90 Gbps) with different frequency bands, namely 1.76 GHz and 0.88 GHz. Similarly, mode 0 and mode 4 can realize the same transmission rate (0.95 Gbps) with different frequency bands, namely 1.76 GHz and 0.88 GHz. By alternately arranging transmission modes (modes 3 to 5) whose frequency bands are only half that in a conventional transmission mode and conventional transmission modes (modes 0 to 2) as illustrated in FIG. 4, it is possible to transmit AV signals of a maximum number of channels of four within a bandwidth of 9 GHz around 60 GHz.

Figures 5, 6, 7:
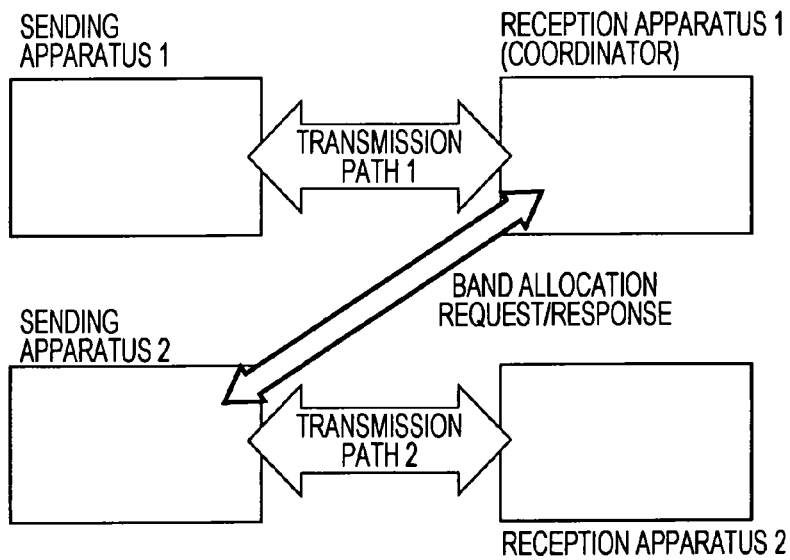
FIG. 5 is a diagram illustrating predicted values of the number of antennas in new transmission modes (modes 3 to 5) necessary to maintain transmission path quality required by conventional transmission modes (modes 0 to 2).
FIG. 6 is a diagram illustrating a relationship between AV signal formats and transmission rates.
FIG. 7 is a diagram for describing a band management (coordination) function in the wireless transmission system.

FIG. 5 illustrates predicted values of the number of antennas in the new transmission modes (modes 3 to 5) necessary to maintain transmission path quality required in the conventional transmission modes (modes 0 to 2). In FIG. 5, the number of antennas necessary in the conventional transmission modes (modes 0 to 2) is determined to be "1", and the predicted values of the number of antennas are indicated by ratios thereto. Because, in the conventional transmission modes, only the modulation method is switched whereas the transmission band is not changed, the number of antennas does not change. In the new transmission modes, since the transmission band is reduced to half, the number of antennas is made to be exponentially proportional thereto in order to maintain necessary transmission path quality. If the number of antennas decreases, the number of antenna circuits to be used also decreases proportionally, and therefore electrical power consumption is substantially directly proportional to the number of antennas.

FIG. 6 illustrates the relationship between AV signal formats and the transmission rates. An SD (Standard Definition) signal may have a transmission rate of 0.442 Gbps if the signal uses 8 bits for each of RGB. However, since mode 0 is used as a conventional transmission mode, the number of antennas and electrical power consumption are not different from those in other transmission modes.

When mode 3, which is a new transmission mode, is selected, the transmission rate is 0.48 Gbps. This satisfies a necessary transmission rate and therefore allows the number of antennas on the sending side to be 1/10 and that on the reception side to be 1/40, whereby electrical power consumption can be reduced by the same ratio. Similarly, in the case of an HD (High Definition) signal, the number of antennas and electrical power consumption can be 3/4 to 1/2 by using mode 5. By selecting a transmission mode in accordance with the format of an AV signal to be transmitted as described above, reduction of the occupied bandwidth and electrical power consumption can be possible.

[Band Management (Coordination) Function in Wireless Network of Reception Apparatus]

The band management (coordination) function of the reception apparatus 200 is described. It is to be noted that a reception apparatus having a band management function like this serves as a reception apparatus as well as a coordinator.

FIG. 7 is a conceptual diagram of the band management (coordinator) function. In the same wireless network, there is at least one wireless apparatus that manages the entire band and is called a coordinator. In FIG. 7, the wireless apparatus having the band management function is described as a reception apparatus 1. When transmitting digital information such as an AV signal to the reception apparatus 1, a sending apparatus 1 makes a band allocation request to the reception apparatus 1 (coordinator). The reception apparatus 1 makes a judgment from the current band occupation situation and performs band allocation, and the transmission starts.

When another sending apparatus 2 starts data transmission to a reception apparatus 2, the sending apparatus 2 makes a new band allocation request to the reception apparatus 1 (coordinator). The reception apparatus 1 makes a judgment as to whether or not a band in the same channel is sufficient, and if there is an extra band, a new band is allocated to the same channel by Time Domain Multiplex TDM. If the band is insufficient in the same channel, a band is allocated using another channel. If the band is still insufficient in another channel, however, the band allocation is determined to be impossible and the sending apparatus 2 is notified that the transmission is impossible.

In this embodiment, when performing band allocation, the reception apparatus 1 (coordinator) performs band allocation on the basis of the information regarding physical layers (transmission mode information and user setting information relating to electrical power consumption) of each reception apparatus and sending apparatus. In this case, the reception apparatus 1 (coordinator) determines a transmission mode to be used for digital information transmission on the basis of information regarding a transmission rate necessary for digital information transmission as well as the user setting information relating to electrical power consumption. In addition, after that, the reception apparatus 1 (coordinator) decides to change the transmission mode to be used for the digital information transmission on the basis of information regarding transmission path quality relating to digital information received by the reception apparatus.

[Operation During One-to-One Transmission]

Figure 8:
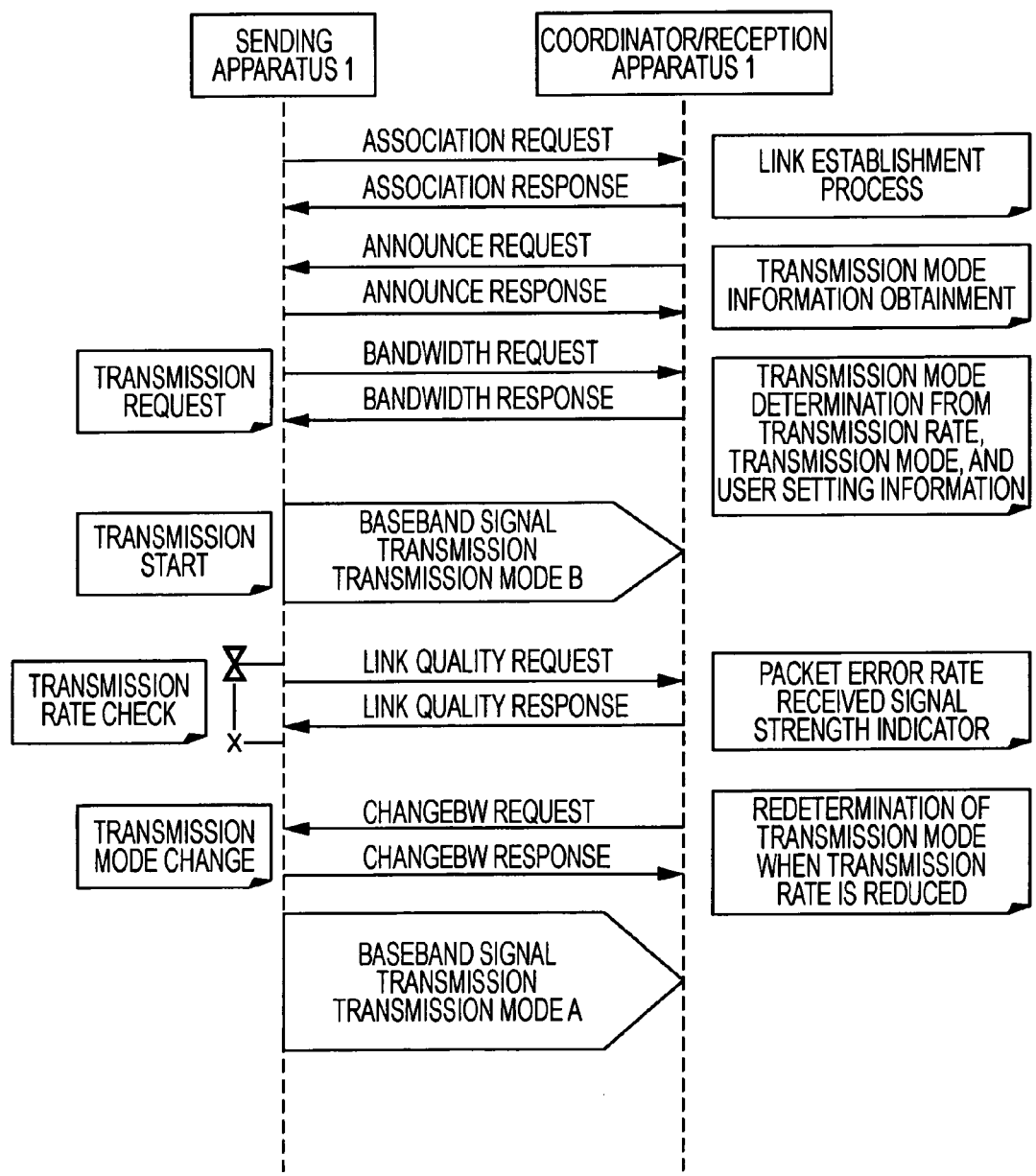
FIG. 8 is a sequence diagram illustrating an example of an MAC control sequence during one-to-one transmission in the wireless transmission system.

FIG. 8 illustrates an example of an MAC control sequence during one-to-one transmission. The reception apparatus 1 (coordinator) executes a link establishment process in accordance with an association request from the sending apparatus 1 that is trying to participate in a wireless network. In this case, when the wireless network is currently available, the reception apparatus 1 (coordinator) sends back an indication that the connection is possible using an association response to the sending apparatus 1.

Next, the reception apparatus 1 (coordinator) sends an announce request to the sending apparatus 1 to obtain function information supported by the sending apparatus 1. The reception apparatus 1 (coordinator) obtains information regarding transmission modes supported by the sending apparatus 1 from an announce response sent back from the sending apparatus 1 in accordance with the announce request.

The sending apparatus 1 generates a transmission request when there is an AV signal (digital information) to be transmitted. In this case, the sending apparatus 1 sends a BandWidth request to the reception apparatus 1 (coordinator) in order to make an allocation request of a band necessary for transmission of the AV signal. In the BandWidth request, information regarding a transmission rate necessary to transmit digital information is included.

The reception apparatus 1 (coordinator) determines the transmission mode on the basis of the information regarding a transmission mode obtained from the above-described announce response and the information regarding a necessary transmission rate included in the BandWidth request, as well as the user setting information. The reception apparatus 1 (coordinator) then sends back a BandWidth response including information regarding a determined transmission mode to the sending apparatus 1.

The user setting information is user setting information relating to electrical power consumption. User setting is performed, for example, on the basis of a user setting screen displayed on the display unit 203 of the reception apparatus 1 (coordinator). FIG. 9 illustrates an example of the user setting screen. A user can perform electrical power consumption setting by selecting an item "energy-saving setting" from among setting items. The user can set "standard" or "reduced" for electrical power consumption. FIG. 9 illustrates a condition in which electrical power consumption is set to "reduced".

Conventionally, a process for selecting the fastest transmission mode that satisfies a requested transmission rate from among transmission modes on the basis of the requested transmission rate has been executed. In addition, even if the transmission path quality has deteriorated, the transmission mode has not been changed and processing of an AV signal to be transmitted has been executed to reduce the necessary transmission rate. However, in this embodiment, the transmission mode is determined in view of the above-described user setting information relating to electrical power consumption. In this case, when electrical power consumption is set to "reduced", transmission modes (modes 3 to 5) whose frequency bands are only half that of a conventional transmission mode are preferentially selected.

The sending apparatus 1 uses the transmission mode designated by the BandWidth response from the reception apparatus 1 (coordinator) to start transmission of the AV signal. In the case of the sequence example of FIG. 8, a condition in which transmission modes (modes 3 to 5) whose frequency bands are only half that of a conventional transmission mode are decided upon and the transmission of the AV signal is started in this transmission mode (transmission mode B) is illustrated.

The sending apparatus 1 regularly sends a link quality request to the reception apparatus 1 (coordinator) during the transmission of the AV signal. The reception apparatus 1 (coordinator) sends back, to the sending apparatus 1, a link quality response including information regarding transmission path quality relating to the AV signal sent from the sending apparatus 1. Here, the information regarding the transmission path quality may be, for example, a PER (Packet Error Rate), a received signal level (RSSI), or the like. An information apparatus 1 can check actual transmission path information on the basis of transmission path quality information included in the link quality response from the reception apparatus 1 (coordinator).

The reception apparatus 1 (coordinator) checks an actual transmission rate from the above-described transmission path quality information. In addition, when the transmission path quality is one that can be lower than the necessary transmission rate, the reception apparatus 1 (coordinator) sends a ChangeBW request using new parameters to the sending apparatus 1 in order to change to a new transmission mode. The sending apparatus 1 sends back a ChangeBW response to the reception apparatus 1 (coordinator) in accordance with the ChangeBW request and continues the transmission in the new transmission mode. Thus, when the transmission path quality deteriorates, the sending apparatus 1 continues the transmission of an AV signal by switching to a new transmission mode.

In the case of the sequence example of FIG. 8, a condition in which the transmission mode is changed to those modes (modes 0 to 2) whose frequency bands are the same as that of a conventional transmission mode and the transmission of the AV signal is continued in this transmission mode (transmission mode A) is illustrated. Conventionally, a request of a transmission band has been requested from a sending apparatus side to a coordinator, but, in this embodiment, it is possible to issue a request for changing the transmission band from a coordinator side to the sending apparatus on the basis of the transmission path quality information.

It is to be noted that although it is not illustrated in the sequence example of FIG. 8, the reception apparatus 1 (coordinator) keeps checking the actual transmission rate from the above-described transmission path quality information even after that. In addition, if the transmission path quality improves again, the reception apparatus 1 (coordinator) changes the transmission mode A to the transmission mode B and, after that, if the transmission path quality deteriorates again, the reception apparatus 1 (coordinator) changes the transmission mode B to the transmission mode A. This operation is repeated.

Figure 10:
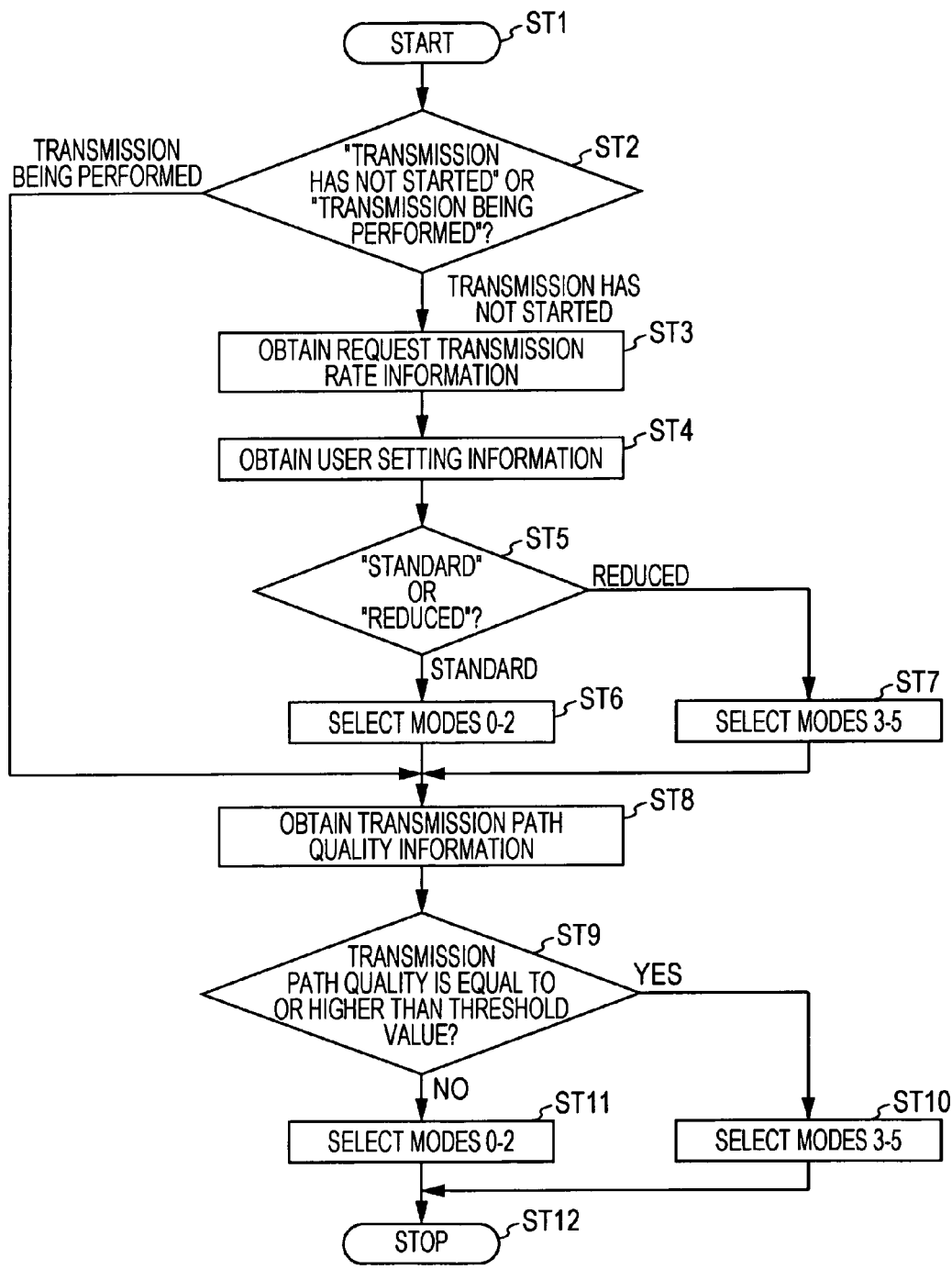
FIG. 10 is a flowchart illustrating an example of a transmission mode determination process at a coordinator (reception apparatus 1).

A flowchart of FIG. 10 illustrates an example of a transmission mode determination process in the reception apparatus 1 (coordinator).

In step ST1, the coordinator starts the processing and, after that, proceeds to processing of step ST2. In this step ST2, the coordinator judges whether transmission of an AV signal has not yet started or whether transmission is being performed. If it is before the start of transmission, the coordinator proceeds to processing of step ST3.

In this step ST3, the coordinator obtains the information regarding a request transmission rate included in the BandWidth request transmitted from the sending apparatus 1. In addition, in step ST4, the coordinator obtains the user setting information relating to the electric power consumption and, after that, proceeds to processing of step ST5. In this step ST5, the coordinator judges whether the setting of the electric power consumption is "standard" or "reduced".

If the setting is set to "standard", in step ST6, the coordinator selects a transmission mode that satisfies the request transmission rate from among the transmission modes (modes 0 to 2) whose frequency bands are the same as that of a conventional transmission mode. On the other hand, if it is set to "reduced", in step ST7, the coordinator selects a transmission mode that satisfies the request transmission rate from among the transmission modes (modes 3 to 5) whose frequency bands are only half that of a conventional transmission mode.

After the processing of step ST6 or step ST7, the coordinator proceeds to processing of step ST8. The coordinator also proceeds to the processing of step ST8 when it is judged that transmission is being performed in step ST2 described above. In this step ST8, the coordinator obtains the transmission path quality information. The coordinator then, in step ST9, judges whether or not the transmission path quality is equal to or higher than a threshold value. For example, when the information regarding the transmission path quality is PER, the threshold value is judged to be this PER value. In contrast, when the information regarding the transmission path quality is RSSI (received signal level), the threshold value is judged to be this RSSI value.

If the transmission path quality is equal to or higher than a threshold value, the coordinator proceeds to processing of step ST10. In this step ST10, when the setting of electrical power consumption is "reduced", the coordinator selects a transmission mode that satisfies the request transmission rate from among the transmission modes (modes 3 to 5) whose frequency bands are only half that of a conventional transmission mode. It is to be noted that if this transmission mode has already been selected, the selection is continued. After the processing of step ST10, the coordinator terminates the processing of step ST12.

In addition, if the transmission path quality is smaller than the threshold value, the coordinator proceeds to processing of step ST11. In this step ST11, when the setting of electrical power consumption is "reduced" and a transmission mode that satisfies the request transmission rate has been selected from among the transmission modes (modes 3 to 5), the coordinator cancels the selection. That is, the coordinator selects a transmission mode that satisfies the request transmission rate from among the transmission modes (modes 0 to 2). It is to be noted that if this transmission mode has already been selected, the selection is continued. After the processing of step ST11, the coordinator terminates the processing in step ST12.

Figure 11:
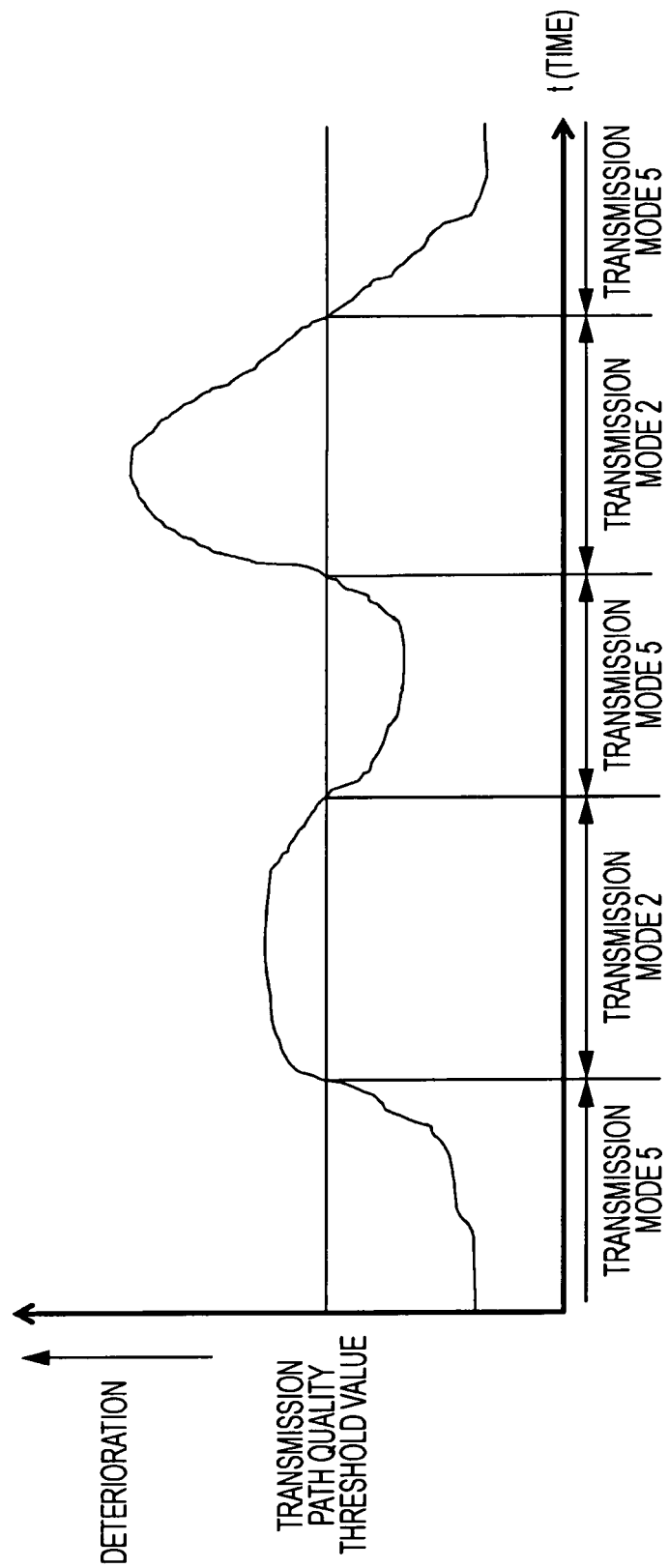
FIG. 11 is a conceptual diagram of the transmission path quality and transmission mode switching.

FIG. 11 illustrates a conceptual diagram of the transmission path quality and the transmission mode switching. In this example, a condition in which the setting of electrical power consumption is set to "reduced" and mode 5, which satisfies the request transmission rate, is selected at the beginning from among the transmission modes (mode 3 to mode 5) whose frequency bands are only half that of a conventional transmission mode is illustrated. In this case, if the transmission path quality deteriorates and becomes lower than the threshold value after that, mode 5 is changed to mode 2, which satisfies the request transmission rate, from among the transmission modes (mode 0 to mode 2) whose frequency bands are the same as that of a conventional transmission mode. Furthermore, if the transmission path quality improves and becomes higher than the threshold value after that, mode 2 is changed to mode 5 again. A similar operation is repeated after that.

It is to be noted that a threshold value for the transmission path quality when the transmission modes (modes 3 to 5) are changed to the transmission modes (modes 0 to 2) and a threshold value for the transmission path quality when the transmission modes (modes 0 to 2) are changed to the transmission modes (modes 3 to 5) do not need to be the same and may be different. In this case, for example, the threshold value for the transmission path quality when the transmission modes (modes 0 to 2) are changed to the transmission modes (modes 3 to 5) is set to be higher than that for the transmission path quality when the transmission modes (modes 3 to 5) are changed to the transmission modes (modes 0 to 2).

[Operation when New Sending Apparatus is Added]

Figure 12:
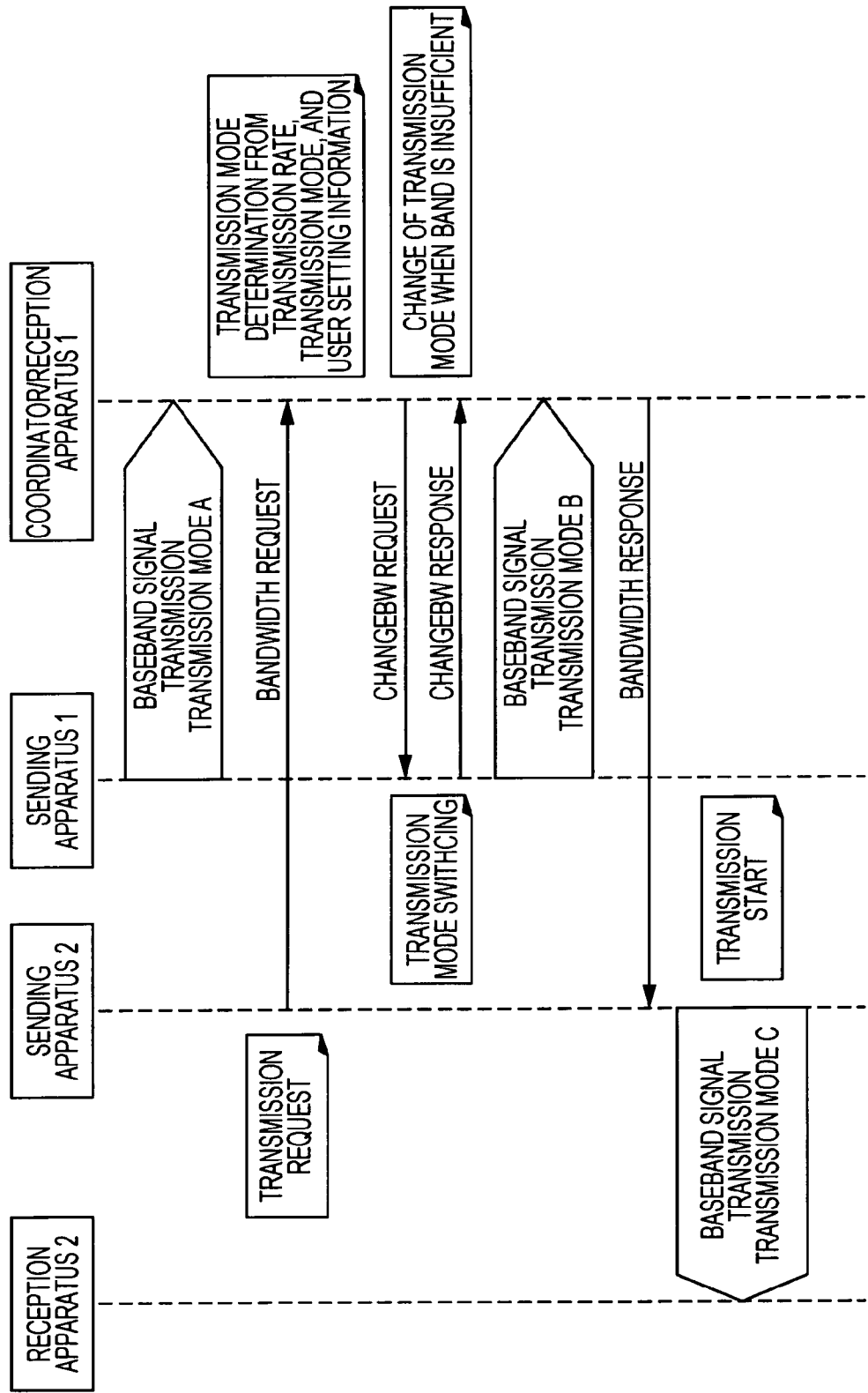
FIG. 12 is a sequence diagram illustrating an example of an MAC control sequence when a new sending apparatus (sending apparatus 2) is added in the wireless transmission system.

FIG. 12 represents an example of an MAC control sequence when a new sending apparatus (sending apparatus 2) is added. In the conventional art, when the new sending apparatus 2 has been added to a wireless network, if a necessary sending band or channel has been insufficient, the reception apparatus 1 (coordinator) has had to reject a transmission request until a transmission band or channel has become vacant. However, in this embodiment, the new sending apparatus 2 is able to transmit by designating a new transmission mode for the sending apparatus 1 that has already performed transmission, thereby securing a transmission band or channel.

In the control sequence example of FIG. 12, description is made from a point of time at which the reception apparatus 2 and the sending apparatuses 1 and 2 have already terminated the association request/response and the announce request/response processes with the reception apparatus 1 (coordinator). In the case of the sequence example of FIG. 12, the transmission of an AV signal from the sending apparatus 1 to the reception apparatus 1 (coordinator) is performed in the transmission mode A whose frequency band is the same as that of a conventional transmission mode.

The sending apparatus 1 transmits the AV signal in a transmission mode that has already been secured, but if the new sending apparatus 2 requests transmission, the reception apparatus 1 (coordinator) determines the channel and the transmission mode from a vacant band in the current channel and vacant band information of another channel. If the band is insufficient, the reception apparatus 1 (coordinator) sends a ChangeBW request for performing band limitation using a transmission mode change to the sending apparatus 1.

When the transmission rate is not affected even if band limitation is performed, the sending apparatus 1 sends back a ChangeBW response in accordance with the ChangeBW request and continues the transmission in a new transmission mode. In this case, an AV signal from the sending apparatus 1 to the reception apparatus 1 (coordinator) is changed from a condition in which the AV signal is transmitted in the transmission mode A to a condition in which the AV signal is transmitted in the transmission mode B whose frequency band is only half that of a conventional transmission mode.

The sending apparatus 1 (coordinator) uses band information that can be newly secured to send back a BandWidth response to the sending apparatus 2. The sending apparatus 2 uses a transmission mode designated by the BandWidth response from the reception apparatus 1 (coordinator) to start the transmission of the AV signal to the reception apparatus 2. In the case of the sequence example of FIG. 12, a condition in which the transmission modes (modes 0 to 2) whose frequency bands are the same as that of a conventional transmission mode are decided upon and the transmission of the AV signal is started in this transmission mode (transmission mode C) is illustrated.

It is to be noted that although it is not illustrated in the sequence example of FIG. 12, during the transmission, the reception apparatus 1 (coordinator) performs control of the band limitation according to the transmission path quality as in the example of the MAC control sequence of FIG. 8. That is, the reception apparatus 1 (coordinator) continuously checks the transmission path quality between the sending apparatus 1 and the reception apparatus 1 and between the sending apparatus 2 and the reception apparatus 2 and, if the transmission path quality deteriorates, performs control of new band limitation.

Figure 14:
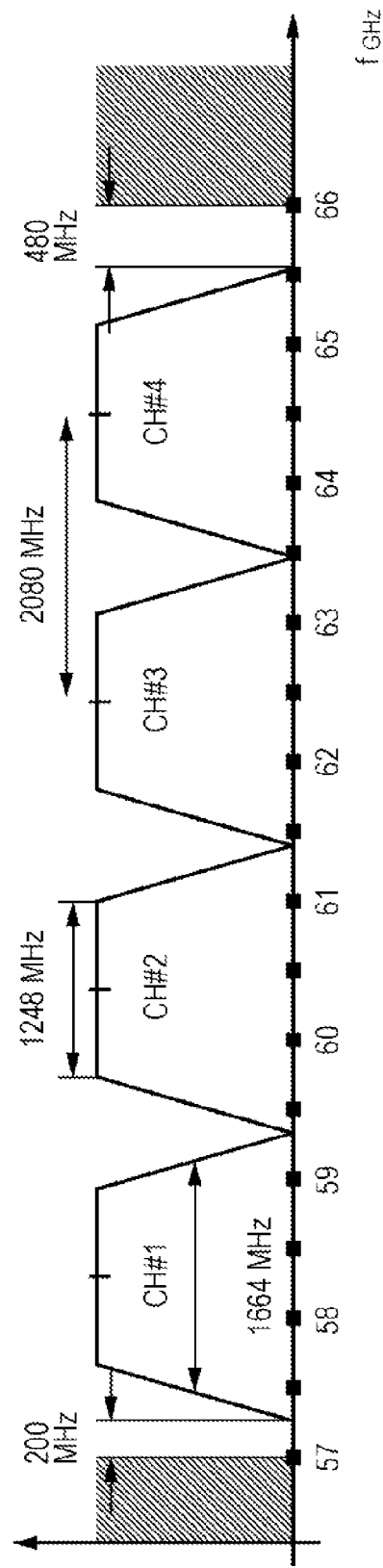
FIG. 14 is a diagram illustrating a channel plan allocated to the 60 GHz millimeter wave.

As illustrated in FIG. 14, when the band around 60 GHz has already been used for entire band transmission of two channels, new entire band transmission is impossible. However, as in this embodiment, by designating the newly defined transmission modes (modes 3 to 5) whose transmission band is only half, transmission of up to four channels at maximum can be performed at the same time as illustrated in FIG. 4.

Figure 13:
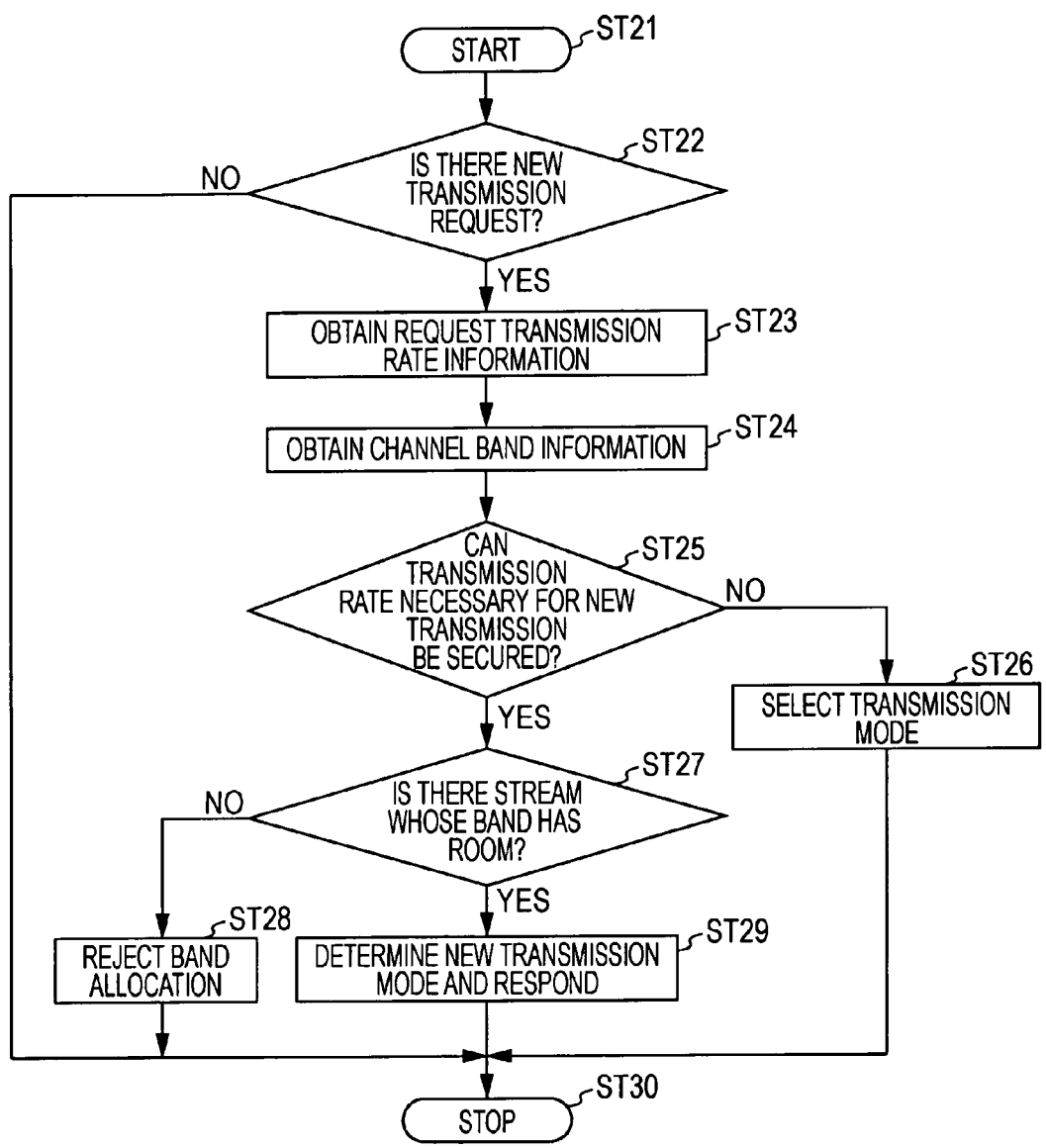
FIG. 13 is a flowchart illustrating an example of a band changing process in the coordinator (reception apparatus 1).

A flowchart of FIG. 13 illustrates an example of a band changing process in the coordinator (reception apparatus 1).

In step ST21, the coordinator starts the processing and, after that, proceeds to processing of step ST22. In this step ST22, the coordinator judges whether or not there is a new transmission request. If there is no new transmission request, the coordinator immediately terminates the processing in step ST30.

If there is a new transmission request in step ST22, the coordinator proceeds to processing of step ST23. In this step ST23, the coordinator obtains information regarding a request transmission rate included in the BandWidth request transmitted from the sending apparatus 2 (new sending apparatus). In addition, in step ST24, the coordinator obtains band usage information for all channels in the wireless network.

Next, in step ST25, the coordinator judges whether or not a transmission rate necessary for new transmission can be secured from the information obtained in step T23 and step T24 described above. If the transmission rate can be secured, in step ST26, the coordinator selects a transmission mode in which a requested transmission rate can be secured, and sends it back as a BandWidth response to the sending apparatus 2. After the processing of this step ST26, the coordinator terminates the processing in step ST30.

If the transmission rate cannot be secured in step ST25, the coordinator proceeds to processing of step ST27. In this step ST27, the coordinator compares, in the stream being currently transmitted, a transmission rate that can be transmitted in that transmission mode and a transmission rate necessary for actual transmission in order to judge whether there is a stream whose band has room. If there is no stream whose band has room, in step ST28, the coordinator sends back a BandWidth response having a flag for indicating that the band is insufficient and rejects the transmission. After the processing of step ST28, the coordinator terminates the processing in step ST30.

If there is a stream whose band has room in step ST27, the coordinator determines a new transmission mode for the stream in step ST29. The coordinator then transmits a ChangeBW request to a sending apparatus of the stream so as to continue the transmission by changing the transmission mode, and secures the band. After that, the coordinator sends back a BandWidth response to the sending apparatus 2 to which transmission is newly requested. After the processing of this step ST29, the coordinator terminates the processing in step ST30.

As described above, in the wireless transmission system 10 illustrated in FIG. 1, the transmission unit 103 of the sending apparatus 100 is configured to be able to support a plurality of transmission modes that use different occupied frequency bands in a channel. In addition, a transmission mode indicated by transmission mode determination information from the coordinator (reception apparatus 200) is used for the transmission unit 103 of the sending apparatus 100 from among the plurality of transmission modes. Therefore, reduction of electrical power consumption and efficient use of channels are possible.

That is, in the coordinator (reception apparatus 200), a transmission mode is determined on the basis of transmission rate information necessary for transmission of an AV signal (digital information) as well as user setting information relating to electrical power consumption. In this case, when the user setting information indicates reduction of electrical power consumption, a transmission mode on a narrowly occupied frequency band side is decided upon so long as a condition that the transmission rate necessary for the transmission of the AV signal is satisfied. With the occupied frequency band being narrowed like this, in the case of the OFDM method, for example, the number of antennas needed can be decreased and electrical power consumption can be reduced.

In addition, in the coordinator (reception apparatus 200), when a certain sending apparatus is sending digital information using a certain channel, a change of a transmission mode used by this certain sending apparatus is decided on the basis of a band allocation request (transmission request) from another sending apparatus. Information regarding a transmission mode that has been subjected to the change decision is then sent from the coordinator (reception apparatus 200) to the certain sending apparatus.

In this case, a transmission mode whose band is wide is changed to a transmission mode whose band is narrow so long as a condition that a transmission rate necessary for transmission of an AV signal is satisfied, so that it is possible to use a channel adjacent to the certain channel for sending the AV signal from the other sending apparatus. Therefore, it is possible to perform sending of digital information from the certain sending apparatus and sending of digital information from the other sending apparatus in parallel, which enables efficient use of channels.

In addition, in the wireless transmission system 10 illustrated in FIG. 1, in the coordinator (reception apparatus 200) during transmission of an AV signal, a change of the transmission mode is decided on the basis of transmission rate information necessary for the transmission of the AV signal as well as the transmission path quality relating to the AV signal (digital information). In addition, if the transmission path quality deteriorates and becomes lower than a certain threshold value, for example, a transmission mode on a narrowly occupied frequency band side is changed to a transmission mode on a widely occupied frequency band side. Thus, since the transmission mode is determined (changed) on the basis of the transmission path quality, the transmission path quality relating to the digital information can be kept high.

2. Modification

It is to be noted that, in the above-described embodiment, the transmission unit 103 of the sending apparatus 100 and the transmission unit 202 of the reception apparatus 200 are configured to be able to support the transmission modes (modes 3 to 5) whose frequency bands are the same as that of a conventional transmission mode, as well as the transmission modes (modes 3 to 5) whose frequency bands are half that of a conventional transmission mode. However, it is also possible to configure them to be able to support not only transmission modes whose occupied bandwidth has two stages (1.76 GHz and 0.88 GHz) as described above, but also a plurality of transmission modes whose occupied frequency bandwidth has three stages or more, so that more elaborate band control can be performed.

In addition, in the above-described embodiment, the reception apparatus 200 that doubles as a coordinator has been described. However, a configuration in which a wireless network incorporates a wireless apparatus as a coordinator is also possible.

INDUSTRIAL APPLICABILITY

According to the present invention, reduction of electrical power consumption and efficient use of channels are possible. The present invention may be applied to a sending apparatus in which digital information such as an AV signal is wirelessly sent in a wireless network and the like.

REFERENCE SIGNS LIST 10 wireless transmission system, 100 sending apparatus, 101 control unit, 102 playback unit, 103 transmission unit, 131 modulation circuit, 132 splitter circuit, 133 antenna circuit, 134 antenna, 133a D/A converter, 133b power amplifier, 200 reception apparatus, 201 control unit, 202 transmission unit, 203 display unit, 204 determination unit, 221 antennas, 222 antenna circuit, 222a power amplifier, 222b A/D converter, 223 mixer circuit, 224 demodulation circuit, 300 transmission path

The invention claimed is:

1. A reception apparatus comprising:
a digital information reception unit that wirelessly receives digital information from a sending apparatus using a certain channel,
wherein the sending apparatus is configured to be able to support a plurality of transmission modes that use different occupied frequency bands in the channel,
the reception apparatus further comprising:
a transmission rate information reception unit that wirelessly receives information regarding a transmission rate necessary for transmission of the digital information from the sending apparatus;
a transmission mode determination unit that determines a transmission mode at least on the basis of the transmission rate information received by the transmission rate information reception unit and setting information relating to electrical power consumption; and
a transmission mode information sending unit that wirelessly sends information regarding the transmission mode determined by the transmission mode determination unit to the sending apparatus,
wherein the plurality of transmission modes that can be supported by the sending apparatus include a first number of first transmission modes that use a first portion of a band of the channel as an occupied frequency band and a second number of second transmission modes that use a second portion of a band of the channel as an occupied frequency band, in which the second portion of the band is less than the first portion of the band, and
wherein, when the setting information relating to the electrical power consumption indicates a first power consumption level, the transmission mode determination unit determines a transmission mode to be used in the sending apparatus from among the first number of first transmission modes and when the setting information relating to the electrical power consumption indicates a second power consumption level which is less than the first power consumption level, the transmission mode determination unit determines the transmission mode to be used in the sending apparatus from among the second number of second transmission modes.

2. The reception apparatus according to claim 1,
wherein the transmission mode determination unit determines the transmission mode on the basis of the transmission rate information, the setting information relating to electrical power consumption, and transmission path quality relating to the digital information.

3. The reception apparatus according to claim 1,
wherein the digital information reception unit adopts an OFDM method or a DS-SS method.

4. A wireless apparatus that manages a band in a wireless network including a sending apparatus and a reception apparatus,
wherein the sending apparatus wirelessly sends digital information to the reception apparatus using a certain channel and is configured to be able to support a plurality of transmission modes that use different occupied frequency bands in the channel,
the wireless apparatus comprising:
a transmission mode determination unit that determines, when there is a band allocation request from the sending apparatus, a transmission mode that satisfies a request transmission rate from among the plurality of transmission modes at least on the basis of information regarding the request transmission rate included in the band allocation request and setting information relating to electrical power consumption; and
a transmission mode information sending unit that wirelessly sends information regarding the transmission mode determined by the transmission mode determination unit to the sending unit,
wherein the plurality of transmission modes that can be supported by the sending apparatus include a first number of first transmission modes that use a first portion of a band of the channel as an occupied frequency band and a second number of second transmission modes that use a second portion of a band of the channel as an occupied frequency band, in which the second portion of the band is less than the first portion of the band, and
wherein, when the setting information relating to the electrical power consumption indicates a first power consumption level, the transmission mode determination unit determines a transmission mode to be used in the sending apparatus from among the first number of first transmission modes and when the setting information relating to the electrical power consumption indicates a second power consumption level which is less than the first power consumption level, the transmission mode determination unit determines the transmission mode to be used in the sending apparatus from among the second number of second transmission modes.

5. The wireless apparatus according to claim 4,
wherein the transmission mode determination unit also determines to change a transmission mode to be used in the sending apparatus on the basis of transmission path quality relating the digital information when the sending apparatus is sending the digital information, and
wherein the transmission mode information sending unit also sends information regarding a transmission mode determined to be changed by the transmission mode determination unit to the sending apparatus.

6. The wireless apparatus according to claim 4,
wherein the transmission mode determination unit also determines to change a transmission mode to be used in the sending apparatus on the basis of a band allocation request from another sending apparatus, and
wherein the transmission mode information sending unit also sends information regarding a transmission mode determined to be changed by the transmission mode determination unit to the certain sending apparatus.

7. A reception apparatus comprising:
a digital information reception unit that wirelessly receives digital information from a sending apparatus using a certain channel,
wherein the sending apparatus is configured to be able to support a plurality of transmission modes that use different occupied frequency bands in the channel, the reception apparatus further comprising:
a transmission rate information reception unit that wirelessly receives information regarding a transmission rate necessary for transmission of the digital information from the sending apparatus;
a transmission mode determination unit that determines a transmission mode at least on the basis of the transmission rate information received by the transmission rate information reception unit; and
a transmission mode information sending unit that wirelessly sends information regarding the transmission mode determined by the transmission mode determination unit to the sending apparatus,
wherein the transmission mode determination unit determines the transmission mode on the basis of the transmission rate information as well as user setting information relating to electrical power consumption, and
wherein the plurality of transmission modes that can be supported by the sending apparatus are a certain number of first transmission modes that use an entire band of the channel as an occupied frequency band and a certain number of second transmission modes that use half a band of the channel as an occupied frequency band, and
wherein, when the user setting information relating to the electrical power consumption indicates standard, the transmission mode determination unit determines a transmission mode to be used in the sending apparatus from among the certain number of first transmission modes and when the user setting information relating to the electrical power consumption indicates reduced, the transmission mode determination unit determines the transmission mode to be used in the sending apparatus from among the certain number of second transmission modes.

8. A wireless apparatus that manages a band in a wireless network including a sending apparatus and a reception apparatus,
wherein the sending apparatus wirelessly sends digital information to the reception apparatus using a certain channel and is configured to be able to support a plurality of transmission modes that use different occupied frequency bands in the channel,
the wireless apparatus comprising:
a transmission mode determination unit that determines, when there is a band allocation request from a certain sending apparatus, a transmission mode that satisfies a request transmission rate from among the plurality of transmission modes at least on the basis of information regarding the request transmission rate included in the band allocation request and user setting information relating to electrical power consumption; and
a transmission mode information sending unit that wirelessly sends information regarding the transmission mode determined by the transmission mode determination unit to the certain sending unit,
wherein the plurality of transmission modes that can be supported by the sending apparatus are a certain number of first transmission modes that use an entire band of the channel as an occupied frequency band and a certain number of second transmission modes that use half a band of the channel as an occupied frequency band, and
wherein, when the user setting information relating to the electrical power consumption indicates standard, the transmission mode determination unit determines a transmission mode to be used in the certain sending apparatus from among the certain number of first transmission modes and when the user setting information relating to the electrical power consumption indicates reduced, the transmission mode determination unit determines the transmission mode to be used in the certain sending apparatus from among the certain number of second transmission modes.

9. A transmission mode control method for a sending apparatus that forms a wireless network, that wirelessly sends digital information to a reception apparatus using a certain channel, and that is configured to be able to support a plurality of transmission modes that use different occupied frequency bands in the channel, the transmission mode control method comprising:
a step of wirelessly receiving information regarding a transmission rate necessary for transmission of the digital information from the sending apparatus;
a step of obtaining setting information relating to electrical power consumption;
a step of determining a transmission mode that satisfies a request transmission rate from among the plurality of transmission modes on the basis of the information regarding the transmission rate and the setting information relating to the electrical power consumption; and
a step of wirelessly sending information regarding the determined transmission mode to the sending apparatus,
wherein the plurality of transmission modes that can be supported by the sending apparatus include a first number of first transmission modes that use a first portion of a band of the channel as an occupied frequency band and a second number of second transmission modes that use a second portion of a band of the channel as an occupied frequency band, in which the second portion of the band is less than the first portion of the band, and
wherein, when the setting information relating to the electrical power consumption indicates a first power consumption level, the step of determining determines a transmission mode to be used in the sending apparatus from among the first number of first transmission modes and when the setting information relating to the electrical power consumption indicates a second power consumption level which is less than the first power consumption level, the step of determining determines the transmission mode to be used in the sending apparatus from among the second number of second transmission modes.

* * * * *